3,769,231
PROCESS FOR PREPARING MICROCAPSULES
CONTAINING HYDROPHOBIC OIL DROPS
Hiroharu Matsukawa, Keiso Saeki, and Takeo Shimada, Fujimiya, Shizuoka, Japan, assignors to Fuji Photo Film Co., Ltd., Minami-Ashigara, Japan
No Drawing. Filed Aug. 4, 1971, Ser. No. 169,097
Claims priority, application Japan, Aug. 6, 1970, 45/68,861
Int. Cl. B01j 13/02; B44d 1/02, 1/44
U.S. Cl. 252—316
5 Claims

ABSTRACT OF THE DISCLOSURE

In a process for producing microcapsules containing hydrophobic oil drops by complex coacervation including a conventional prehardening treatment in which an aldehyde and an alkali material are added to the system, the improvement which comprises adding gelatin having an isoelectric point lower than that of the gelatin employed for forming the walls of the coacervates to the system at a temperature lower than the gelling point of the gelatin employed for forming the walls of the coacervates, but prior to the simultaneous presence in the system of said aldehyde and alkali material, in an amount sufficient to prevent an increase in viscosity due to the reaction of gelatin and aldehyde during said prehardening step.

BACKGROUND OF THE INVENTION

(1) Field of the invention

The present invention relates to a process for preparing microcapsules containing hydrophobic oil drops.

More particularly, the present invention relates to a process for preparing microcapsules containing hydrophobic oil drops, characterized in that, in case of preparing microcapsules by a complex coacervation method using gelatin as at least one kind of the hydrophilic colloid, a gelatin derivative having an isoelectric point lower than the gelling point of the gelatin employed for the formation of the wall is added in order to prevent an increase of the viscosity due to the reaction of gelatin and aldehyde in the prehardening treatment and to carry out the prehardening treatment rapidly.

(2) Description of the prior art

In the specification, the term "prehardening treatment" means to subject the gelatin, aldehyde and alkali present in order to promote the reaction of gelatin and aldehyde, while the term "shock" means the rapid increase of the viscosity of the system when the pH of the system approaches the isoelectric point of gelatin, during the prehardening treatment of the coacervates containing the oil drops, more specifically, the phenomenon that capsules are aggregated or coagulated as the increase of the viscosity of the system.

Heretofore, known processes for preparing microcapsules containing hydrophobic oily liquids are described in, for example, U.S. Pat. No. 2,800,457 and Japanese patent publication No. 3,875/62. The process described in the specification of U.S. Pat. No. 2,800,457 consists of 4 steps: (1) emulsifying an oil compatible with water in an aqueous solution of a hydrophilic colloid ionizable in water (the first sol) (emulsifying step); (2) causing coacervation, by the addition of water and/or by the adjustment of the pH, after mixing the emulsion of (1) with an aqueous solution of a hydrophilic colloid ionizable in water (the second sol) and having an electrically opposite charge to that of the colloid of the first sol to obtain coacervates which are composed of the colloid adhered around individual oil drops (step of coacervation); (3) a step of gelation by cooling the coacervates (gelation step); and (4) a step of controlling the pH within the range 9–11 and adding a hardener (prehardening step). It is described in the foregoing U.S. patent specification that as the amount of water employed decreases, the diameter of the aggregated capsules is reduced in the process. We attempted to produce microcapsules by increasing the concentration of colloid to water but failed to prepare mononuclear capsules having heat-resisting strength higher than 125° C. Therefore, it is concluded that, according to the above mentioned U.S. patent, the control of the size of the capsules is limited within 20–30μ, when emulsion drops have an average size of, for example, 5–6μ.

On the other hand, the process described in Japanese patent publication No. 3,875/62 is characterized by the addition of a thickener, for example, acacia, tragacanth gum, methyl cellulose, carboxymethyl cellulose, magnesium aluminum silicate, polyglycolglycerine, syrup and the like, to gather the hydrophilic colloid around the oil drops in step (1), i.e. the emulsifying step, of the above-mentioned U.S. patent. Said process leads only to the coacervation in a colloid of a concentration higher than that of the above-mentioned U.S. patent despite the effort of changing the surface characteristics of the emulsion drops by the coexistence of a thickener with oil drops in advance of the coacervation step, failing to prepare mononuclear capsules. This is due to the fact that the particle size of the capsules has been already determined by the conditions for establishing the coacervation, so that capsules coagulate (shock) at the prehardening step for hardening the coacervate walls even if a coacervation system is established insufficiently.

Microcapsules containing oily liquids prepared by these processes are polynuclear capsules of the grape cluster form. Said polynuclear capsules have the disadvantage of reducing the resolving power in developed coloured images due to the greater particle size when said polynuclear capsules are employed on pressure-sensitive copying papers utilizing the reaction of a leuco dye and clay for the production of a number of copies. (It is noted here that the term "mononuclear" means a single emulsion drop, while the term "polynuclear" means a cluster of emulsion drops.) When capsules prepared by these processes are applied to an original paper by use of an air knife coating method, capsules are classified by the wind pressure from an applicator to cause the change of the composition of the liquid. Therefore, increase of the wind pressure is required, thus preventing the rise of application speed.

An object of the present invention is to provide a process for preparing mononuclear microcapsules containing oil drops and having heat resistivity.

Another object of the present invention is to provide a process for preparing microcapsules containing oil drops yielding a higher coating speed and by a shorter drying step.

SUMMARY OF THE INVENTION

The above objects of the present invention are attained by forming a wall of a polyelectrolytic colloid around hydrophobic oil drops (coacervates) by the coacervation method, and by adding a shock-preventing agent to the coacervates after the gellation of the coacervate wall.

The shock-preventing agent to be employed in the present invention is gelatin having an isoelectric point lower than that of the gelatin to be employed for the formation of the wall. Among such gelatins, particularly preferable are gelatin derivatives which are prepared by the reaction of gelatin and aromatic or aliphatic compounds having a group reactive with gelatin, because said gelatin derivatives have lower isoelectric points.

DESCRIPTION OF THE PREFERRED EMBODIMENTS

Examples of suitable gelatin derivatives are the reaction product of gelatin and an aromatic or aliphatic anhydride, the reaction product of gelatin and a compound having a reactive halogen atom, the reaction product of gelatin and isocyanate, and the reaction product of gelatin and N-arylvinyl-sulphonamide. Processes for preparing these materials are described in the specifications of U.S. Pat. Nos. 2,525,753, 2,614,928 and 2,614,930.

Suitable aromatic and aliphatic anhydrides are phthalic anhydride, benzoic anhydride, trimellitic anhydride, pyromellitic anhydride, sulfophthalic anhydride, dimethyl- and dibutyl substituted tetrahydrophthalic anhydrides, maleic anhydride, chloromaleic anhydride, succinic anhydride and acetic anhydride.

Typical examples of compounds having a reactive halogen atom are as follows: in the first place, compounds having a chlorosulfonyl group, such as benzenesulfochloride,
p-methoxy benzene-sulfochloride,
p-phenoxybenzenesulfochloride,
p-chlorobenzene-sulfochloride,
p-bromobenzene-sulfochloride,
p-toluene-sulfochloride,
m-nitrobenzene-sulfochloride,
m-chlorosulfonyl-benzoylchloride,
m-carboxy-benzene-sulfochloride,
m-carboxy-p-bromo-benzenesulfochloride,
β-naphthylenesulfochloride or
4-phenyl-5-(p-chlorosulfonyl-phenyl)-2-imidazolene.

In the second place, compounds having a fluorosulphonyl group, such as p-aminobenzene sulfo-fluoride,
m-amino-benzenesulfofluoride,
m,p-diaminobenzenesulfofluoride,
p-toluenesulfofluoride,
m-fluorosulfonyl benzoic acid,
2-hydroxy-5-fluorosulfonyl benzoic acid or
m-fluorosulfonylbenzoyl acetoamide.

In the third place, compounds having a carboxylchloride or carboxybromide group, such as phthalyl chloride,
benzoylchloride,
p-nitrobenzoyl-chloride and
p-carboxybenzoylbromide.

In the fourth place, compounds having a free halogen atom, such as p-bromomethyl benzoic acid,
n-amylchloroformate,
benzylchloroformate,
methoxyethylchloroformate,
methoxypropylchlorformate,
phenoxyethylchloroformate,
cyclohexylchloroformate,
cyclopentylchlorformate,
mucochloric acid,
mucobromic acid,
mucochlorobromic acid,
1,3,5-tri(chloroacetyl)-perhydro-1,3,5-triazine,
1,3,5-tri-(bromoacetyl)-perhydro-1,3,5-triazine and
potassium 4-fluoro-3-nitrobenzenesulfonate.

Examples of isocyanates that form gelatin derivatives are phenylisocyanate, p-tolylisocyanate, p-bromophenylisocyanate, p-chlorophenylisocyanate and naphthylisocyanate.

As N-arylvinylsulfonamide derivatives of gelatin, the following are most suitable: the reaction product of gelatin and N-vinylsulfonic anilide, the reaction product of gelatin and N-vinylsulfonic-p-phenetidide, the reaction product of gelatin and N-vinylsulfonic-p-toluidide, and the reaction product of gelatin and N-vinylsulfonic-N-methylanilide.

The preparation of microcapsules containing hydrophobic oil drops according to the present invention may be carried out by the method of complex coacervation caused by dilution with water and/or adjustment of the pH. The production of coacervates due to liquid-liquid phase separation is based on an operation of separating a phase richer in colloid from a phase poorer in colloid, each phase consisting of two or more sorts of hydrophilic colloid sols. In this operation, it is necessary that at least two hydrophilic colloids having electric charges opposite to each other are contained in the colloid and at least one of the two colloids is gelable.

Examples of natural or synthetic hydrophilic colloids are gelatin, casein, alginate, gum arabic, styrene-maleic anhydride copolymer, and polyethylene-maleic anhydride copolymer. Among those mentioned, gelatin is absolutely necessary for the formation of wall films.

Materials to be employed as nuclei of the individual capsules are natural mineral oils, animal oils and vegetable oils. Examples of mineral oils are petroleum and its fractions such as kerosene, gasoline, naphtha and paraffin oil.

Examples of animal oils are fish oil and lard. Among vegetable oils are mentioned peanut oil, lineseed oil, soyabean oil, castor oil and maize oil.

Examples of synthetic oils are biphenyl derivatives, phosphoric acid derivatives, naphthalene derivatives, phthalic acid derivatives, salicylic acid derivatives and the like. The use of anionic surface active agents, cationic surface active agents or nonionic surface active agents for the emulsification and dispersion of oil drops of nuclear material in water prevents the formation of an emulsion of the water-in-oil type (W/O emulsion), thus the inversion. Thus, the addition of said surface active agents is desirable.

An emulsion of the oil in water type can be prepared by the emulsification of oil drops of nuclear material in an aqueous solution of a hydrophilic colloid destined to become the wall material. Dilution with water and/or adjustment of the pH of the emulsion leads to the piling up of coacervates around the emulsified oil drops. The formation of mononuclear capsules is favored by conditions insufficient for coacervation, for example, by applying the following steps:

(1) reducing the amount of water for dilution,
(2) adjusting the value of the pH out of the range for the greatest yield of coacervates,
(3) changing the ratio of the colloids, and
(4) containing inorganic or organic salts of metals.

Out of these steps a combination of steps (1) and (2) is usually sufficient for the formation of mononuclear capsules.

If the value of the pH is adjusted to be that for the greatest yield of coacervate, the amount of water for dilution may be reduced. If the value of the pH lies out of the suitable range, the amount of water for dilution may be increased.

The addition of inorganic or organic salts ordinarily reduces the yield of coacervate, so it is desired to establish the condition which is more sufficient for coacervation than in the steps (1) and (2).

Piled up on the periphery of oil drops by the coacervation step, the coacervates are gelled by cooling from outside the vessel.

For the hardening of the wall films, formaldehyde is added and an alkali is added to adjust the pH of the system to the alkaline side. In this prehardening treatment, if the shock-preventing agent is not added to the system, the insufficient condition for coacervation, so that mononuclear capsules are obtained, causes the coagulation of the capsules. The thus prehardened coacervates are hardened by heating whereby the heat resisting strength of the capsules produced are increased. The shock-preventing agent is added at a temperature lower than the setting point of gelatin for forming the wall films, more particularly, at a temperature lower than 20° C., preferably lower than 15° C.

In the process of the invention, the hardening agent may be added in all steps while the addition of alkali must be conducted after the cooling step because each step prior to the prehardening step must be conducted in the absence of alkali. And, since the aggregation of coacervates at the prehardening step is caused by the presence of both hardening agent and alkali (when the system is higher than pH 7), the shock-preventing agent must be added to the system prior to the presence of both the hardening agent and alkali. Excepting the above limitation, other embodiments can be used for the process of the present invention.

The amount of the shock-preventing agent added is more than $1/20$, preferably $1/10$ to $1/2$ the total weight of the two or more hydrophilic colloids having different electric charges and capable of forming the wall. The addition of the shock-preventing agent makes the prehardening treatment of capsules under the insufficient condition for coacervation easy whereby capsule liquid can be obtained in high concentration.

In the process of encapsulation described in the examples of U.S. Pat. No. 2,800,457, which contains a step of dilution with water and a step of adjusting the pH, the amount of water to be employed is 20.5 g. to 1 g. of two or more sorts of colloids having different electric charges at the pH value 4.5 for coacervation. If the amount of water is reduced, capsules are aggregated at the step of prehardening treatment.

According to the process of the present invention, the amount of water is reduced to 15 g. by adding the shock-preventing agent to the system after the gelation.

When microcapsules according to the present invention are coated on papers to produce pressure-sensitive copying papers, the pressure-sensitive copying papers do not form color stain (fog) before use even if they are contacted with clay-coated papers because the microcapsules are mononuclei and they form distinct color in multi-copying use when contacted with the clay-coated paper. Further, in case of coating the microcapsules on supports by an air-knife coating method, the air pressure is reduced and the classification of capsules due to the wind pressure is reduced, and some coating properties of the capsule liquid are improved.

The present invention will be explained more particularly by the following examples without being limited to them. The heat resisting characteristics in the examples were determined by the concentration of developed color formed on the surface of a clay-coated paper when contacted with an original and written on by a pressed pencil, the original paper being coated with capsules prepared by microencapsulation of an oil in which 2% crystal violet lactone was dissolved, and heated in a hot air drier.

The clay-coated paper was prepared as follows: 100 parts of Japanese acid clay, treated with sulfuric acid, were dispersed by a homogenizer into 300 parts of water containing 6 parts of a 40% aqueous solution of caustic soda, and then to the dispersion, 40 parts of a styrene-butadiene latex (trade name "Dow Latex 620," manufactured by Dow Chemical Co.), was added. The mixture thus obtained was coated on paper of 50 g./m.$^2$ by an air knife coating method at the rate of 12 g./m.$^2$ as solid.

Preparations of gelatin derivatives will be shown by the following examples. (All starting materials of gelatin have the isoelectric point 4.90.)

PREPARATION 1

(m-Carboxybenzenesulfochloride derivative)

100 g. of gelatin was dissolved in 625 ml. of water and heated to 50° C., and then a 10% aqueous solution of caustic soda was added to the solution with stirring to adjust the pH of the solution to 10. The solution thus obtained was stirred for thirty minutes, and 10.5% of m-carboxy-benzene-sulfochloride dissolved in 50 ml. isopropylalcohol was added while the system is maintained at pH 10 by the addition of a 10% aqueous solution of caustic soda.

After stirring for 10 minutes at 50° C., dilute sulfuric acid was added to the mixture to reduce the pH to 7. The mixture was cooled, washed with water and dried with hot air. The gelatin thus obtained had an isoelectric point of 4.20.

PREPARATION 2

(Maleic anhydride derivative)

100 g. of gelatin was dissolved in 600 ml. of water and heated to 40° C., and then 10% caustic soda was added to adjust the solution thus obtained to pH 10. After stirring for 10 minutes vigorously, 10 g. of maleic anhydride dissolved in 50 ml. of acetone was added. During the above steps, the temperature of the mixture was kept at 40° C., while the system was kept at about pH 10.

After stirring for 10 minutes, dilute sulfuric acid was added to reduce the pH to 7. The mixture was cooled and solidified in a refrigerator, washed with water and dried as in Preparation 1. The gelatin thus obtained had an isoelectric point of 3.80.

PREPARATION 3

(Phthalic anhydride derivative)

As in the above two preparations, 7 g. of a solution of phthalic anhydride dissolved in 50 ml. of acetone was added to 100 g. of gelatin to obtain a gelatin derivative. The derivative was washed with water and dried. The gelatin obtained had an isoelectric point of 3.98.

Other gelatin derivatives were prepared similarly as in the above examples. The isoelectric point was varied by the modulation of the amount of gelatin to that of the materials reactive with gelatin. In the following examples and comparative examples, the term "part" means "part by weight."

COMPARATIVE EXAMPLE 1

6 parts of acid-treated gelatin having an isoelectric point of 7.8 and 6 parts of gum arabic were dissolved in 30 parts of water, heated to 40° C. To the solution, 0.5 part of Turkey red oil as an emulsifier was added. Into the colloid solution, 30 parts of a 2.0% dichlorodiphenyl solution of CVL were emulsified with vigorous stirring to prepare an O/W emulsion having a particle size of 6-10 microns. To the emulsion, 190 parts of water heated to 45° C. were added. While further stirring, a 50% aqueous acetic acid solution was added dropwise to adjust the pH of the system to 4.4. After maintaining the temperature for 15 minutes, the resulting mixture was cooled from the outside of the reaction vessel to gel the wall of the coacervates.

When the temperature of the system was 15° C. with stirring, 3.0 parts of a 37% formaldehyde solution were added. When the temperature of the liquid was 10° C. (the viscosity of the capsule liquid was determined at 10° C. to be 35 cp. by use of a B-type rotating viscosimeter, 30 r.p.m. No. 1 rotor, hereinafter referred to as "$B_1$ 30 r.p.m."), a 10% aqueous solution of caustic soda was added while adding the aqueous solution of caustic soda for 15 minutes, the pH of the capsule liquid was adjusted to 6.5, in which the viscosity of the liquid was 125 cp. ($B_1$ 30 r.p.m.). While adding the aqueous solution of caustic soda for a further 10 minutes, the pH of the liquid was 7.0, in which the viscosity of the liquid was 850 cp.

When the pH of the liquid reached 7.3, the capsule liquid coagulated. The capsules had uneven form and the size of the larger capsules was 5-10 mm.

In the comparative example, the addition of alkali and formalin for prehardening treatment was carried out by the following two methods: (1) formaldehyde was added after the pH of the capsule liquid was elevated to the alkaline side (pH 9.5); and (2) alkali and formaldehyde were added simultaneously from two nozzles, respectively.

Capsules aggregated in both methods.

EXAMPLE 1

6 parts of gelatin treated with acid and having an isoelectric point of 7.8 and 6 parts of arabia gum were dissolved in 30 parts of water at 40° C. To the resulting solution 0.2 part of sodium nonylbenzene sulfonate was added as an emulsifier. 30 parts of a 20% dichlorodiphenyl solution of CVL were added to the colloid solution with vigorous stirring to prepare an O/W emulsion. When the size of the oil drops reached 6–10μ, stirring was stopped.

190 parts of hot water at 45° C. were added thereto. With stirring, a 50% aqueous solution of acetic acid was added dropwise to adjust the pH of the system to 4.4. After the system was kept at the present temperature with stirring for 15 minutes, the system was cooled from the outside of the vessel to gel the colloidal walls. When the temperature of the system was 15° C. with stirring, 30 parts of a 37% aqueous formaldehyde solution were added. When the temperature of the liquid was 10° C., 20 parts of a 10% aqueous solution of gelatin treated with lime and having an isoelectric point of 4.8 was added and the solution was heated to 35° C. A 10% aqueous solution of caustic soda was dropped in at the same speed as in Comparative Example 1. When the pH of the system was 10.0, dropping was stopped.

The viscosity was 85 cp. ($B_1$ 30 r.p.m.) at pH 6.5, 128 cp. at pH 7.0, 234 cp. at pH 8.0 and 168 cp. at pH 10.0. After further stirring, the capsule liquid was heated to 60° C. The thus obtained capsules were not aggregated and had a good heat resisting property.

EXAMPLE 2

The same procedure as in Comparative Example 1 was repeated except that 30 parts of a 5% aqueous solution of a phthalic anhydride derivative of gelatin (having an isoelectric point of 3.98) were added at 10° C. after the addition of a 37% formalin solution. The viscosity after 2 minutes of addition was 36 cp. ($B_1$ 30 r.p.m.). A 10% aqueous solution of caustic soda was added dropwise over 15 minutes to adjust the system to pH 6.5.

In this case, the viscosity of the liquid was 55 cp. ($B_1$ 30 r.p.m.). While continuing the dropping of the aqueous solution of caustic soda, the viscosity of the liquid was measured. The viscosity was 62 cp. at pH 7.0, 72 cp. at pH 7.5, 67 cp. at pH 8.0 and 45 cp. at pH 10.0. The time spent for the addition of the aqueous solution of caustic soda from pH 6.5 to pH 10.0 was 10 minutes. Although the viscosity of the liquid was observed to rise a little, there was no aggregation of capsules.

With stirring, the liquid was heated to 50° C. over a period of 20 minutes to produce a capsule liquid of good heat-resisting properties. When the capsule liquid was observed with a microscope, greater than 98% of the capsules were mononuclear, composed of single emulsion drops. The capsule liquid was coated on a paper and then put in a drying box at 150° C. for 3 hours. The paper was superposed onto a clay coated paper, and pressurized with a ball pen to obtain distinct developed marks.

EXAMPLE 3

6 parts of acid-treated gelatin having an isoelectric point of 7.8 and 6 parts of gum arabic were dissolved in 30 parts of water heated to 40° C. To the solution, 0.5 part of Turkey red oil as an emulsifier was added. Into the colloid solution, 30 parts of a 2.0% dichlorodiphenyl solution of CVL were emulsified with vigorous stirring to prepare an O/W emulsion having a particle size of 6–10 microns. To the emulsion, 190 parts of water heated to 45° C. were added. With further stirring, a 50% aqueous acetic acid solution was added dropwise to adjust the pH of the system to 4.4. After maintaining the temperature for 15 minutes, the resulting mixture was cooled from the outside of the reaction vessel to gel the wall of the coacervates.

30 parts of a 5% aqueous solution of a phthalic anhydride derivative of gelatin were then added and then a 10% aqueous alkali solution was added to adjust the pH of the capsule liquid to 10.0.

In this case, the viscosity of the liquid was 48 cp. Further, 30 parts of a 37% formaldehyde solution were gradually added. When 0.8 part of the aldehyde solution was added to the liquid, the viscosity began to increase. After the addition of 1 part of aldehyde, the viscosity of the liquid was 115 cp., thereafter the viscosity was not increased. After adding the whole aldehyde solution, the viscosity of the liquid was 92 cp. The total time for complete dropping of the aqueous solution of formaldehyde was 18 minutes. The resulting liquid was heated to 50° C. over a period of 20 minutes to harden the walls of capsules. The capsules obtained were mononuclear and did not rupture by a heat resisting test for 3 hours at 150° C.

EXAMPLE 4

6 parts of acid-treated gelatin having an isoelectric point of 7.8 and 6 parts of gum arabic were dissolved in 30 parts of water heated to 40° C. To the solution, 0.5 part of Turkey red oil as an emulsifier was added. Into the colloid solution, 30 parts of a 2.0% dichlorodiphenyl solution of CVL were emulsified with vigorous stirring to prepare an O/W emulsion having a particle size of 6–10 microns. To the emulsion, 190 parts of water heated to 45° C. were added. With further stirring, a 50% aqueous acetic acid solution was added dropwise to adjust the pH of the system to 4.4. After maintaining the temperature for 15 minutes, the resulting mixture was cooled from the outside of the reaction vessel to gel the wall of the coacervates.

30 parts of a 5% aqueous solution of a phthalic anhydride derivative of gelatin were then added. Further, a 37% formaldehyde solution and a 10% aqueous alkali solution were simultaneously added at the same addition speed from two respective nozzles. The viscosity was 50 cp. ($B_1$ 30 r.p.m., after 10 minutes from the beginning of addition), at pH 6.5, and when the addition of the two solutions was continued, the viscosity was 66 cp. (after 15 minutes dropping) at pH 7.5 and 42 cp. at pH 10.0. The resulting liquid was heated to 50° C. over a period of 20 minutes to harden the capsule walls. More than 99% of the prepared capsules were mononuclear. The capsules were not broken during a 3 hour heat-resisting test at 150° C and gave distinct color marks.

EXAMPLE 5

6 parts of acid-treated gelatin having an isoelectric point of 7.8 and 6 parts of gum arabic were dissolved in 30 parts of water heated to 40° C. To the solution, 0.5 part of Turkey red oil as an emulsifier was added. Into the colloid solution, 30 parts of a 2.0% dichlorodiphenyl solution of CVL were emulsified with vigorous stirring to prepare an O/W emulsion having a particle size of 6–10 microns. To the emulsion, 190 parts of water heated to 45° C. were added. With further stirring, a 10% aqueous sulfuric acid solution was added dropwise to adjust the pH of the system to 4.2. After maintaining the temperature for 15 minutes, the resulting mixture was cooled from the outside of the reaction vessel to gel the wall of the coacervates.

When the temperature of the liquid was 10° C., 30 parts of a 5% aqueous solution of a m-carboxybenzene sulfochloride derivative of gelatin (isoelectric point 3.98) were added. Afterwards, when the temperature of the liquid was 15° C. with continued stirring, a 37% aqueous formaldehyde solution and a 10% aqueous solution of caustic soda were added simultaneously at the same addition speed from two nozzles, respectively.

The other steps were the same as those in Comparative Example 1. The viscosity was 98 cp. at pH 7.5. Thus obtained capsules were mononuclear and strong during the heat-resisting test.

EXAMPLE 6

30 parts of a mixture of chlorinated paraffin (trade name "TOYOPARAX A–40," chlorine content 40%, manufactured by TOYO SODA KOGYO K.K) and kerosene in the weight ratio of 4:1, in which 2% CVL was dissolved were emulsified in a colloid sol consisting of 0.5 part of methylcellulose, 4 parts of gum arabic and 25 parts of hot water to prepare an O/W emulsion.

Stirring was continued until the maximum size of the oil drops was 10 microns. The resulting liquid was added to an aqueous solution of gelatin consisting of 6 parts of acid-treated gelatin having an isoelectric point of 8.1, and 170 parts of hot water at 45° C. With stirring thereto there was added a 5% aqueous solution of succinic acid to adjust the pH to 4.4. With continued slow stirring, the resulting liquid was cooled from outside of the vessel to gel the coacervate wall films. At 10° C., 30 parts of a 5% aqueous solution of a maleic anhydride derivative of gelatin (isoelectric point 3.80) were added. In this case, the viscosity of the resulting system was found to be 47 cp. ($B_1$ 30 r.p.m.). A 10% aqueous solution of caustic soda was added dropwise over a period of 15 minutes to adjust the pH of the system to 10.0. The viscosity of the system was 120 cp. at pH 7.5. Further, the capsule liquid was heated to 50° C. to obtain hardened microcapsules.

EXAMPLE 7

The same procedure as in Example 2 was repeated except that 185 parts of warm water were added instead of 190 parts of warm water, the pH was adjusted to 4.2 instead of 4.4, and a succinic anhydride derivative of gelatin (the isoelectric point 4.10) was employed instead of a phthalic anhydride derivative of gelatin (isoelectric point 3.98). The viscosity was 119 cp. at pH 7.5 in the step of prehardening. These prepared capsules were mononuclear.

EXAMPLE 8

The same procedure as in Example 6 was repeated except that dioctyl phthalate was used instead of chlorinated paraffin, 190 parts of the gelatin solution was used instead of 170 parts of the gelatin solution and a 10% aqueous solution of hydrochloric acid was used instead of a 5% aqueous solution of succinic acid. The coacervates obtained were gelled by cooling from the periphery of the vessel. At 15° C., 2.5 parts of glyoxal were poured into the system. At 10° C., there was added 30 parts of a 5% aqueous solution of a m-fluorosulfonyl benzoic acid derivative of gelatin (isoelectric point 4.05). A 20% aqueous solution of caustic soda was added dropwise over a period of 15 minutes to adjust the pH of the system to 10.0. The viscosity of the system was 137 cp. ($B_1$ 30 r.p.m.) at pH 7.5. The capsule liquid was heated to 50° C. to improve the heat resisting property of the capsules. The thus obtained capsules were mononuclear and were not broken by heating for 5 hours at 130° C.

EXAMPLE 9

6 parts of acid-treated gelatin having an isoelectric point of 7.9 and 6 parts of gum arabic were dissolved in 35 parts of water at 40° C. To the resulting solution, 0.3 part of sodium alkyl benzene sulfonate as an emulsifier was added and emulsified in 35 parts of dichlorodiphenyl, in which 2% CVL was dissolved to prepare an O/W emulsion. The size of the oil drops was 8–12$\mu$. To said emulsion, 200 parts of a 0.08% aqueous solution of sodium sulfate were added, and the pH thereof was adjusted to 4.3 by adding a 70% aqueous solution of acetic acid with stirring. By cooling from outside of the vessel, the temperature of the resulting liquid was lowered to 8° C. 3.0 parts of 37% formaldehyde were then added, and further, 25 parts of a 7% aqueous solution of a phthalic anhydride derivative of gelatin (isoelectric point 4.30) were added. The pH of the liquid was adjusted to 10 by addition of a 10% aqueous solution of caustic soda over a period of 15 minutes. The viscosity was 85 cp. ($B_1$ 30 r.p.m.) at pH 7.5. The liquid was then heated to 50° C. More than 98% of the prepared capsules were mononuclear and not broken by heating for 5 hours at 150° C.

What is clamied is:

1. In a complex coacervation process for preparing microcapsules containing a hydrophobic oily liquid wherein gelatin is employed as one of the hydrophilic colloids forming the microcapsule walls in combination with a hydrophilic colloid, ionizable in water and having an electrically opposite charge to that of gelatin, said process comprising:
   (1) emulsifying said hydrophobic oily liquid in an aqueous solution of at least one hydrophilic colloid, ionizable in water to form a sol;
   (2) optionally, mixing said sol with an aqueous solution of a hydrophilic colloid to form a second sol;
   (3) forming coacervates comprising hydrophilic colloids, so as to encapsulate individual drops of said hydrophobic oily liquid in said sol;
   (4) cooling the resulting coacervates to gel the hydrophilic colloid thereof at a temperature lower than the gelling point of said gelatin;
   (5) subjecting the system to a conventional prehardening treatment in which an aldehyde and an alkali material are added to adjust the pH of the system to the alkaline side; and
   (6) hardening by heating the gelled hydrophilic colloid to form the microcapsule walls;
the improvement which comprises:
   adding to the system, gelatin having an isoelectric point lower than that of the gelatin employed as the hydrophilic colloid wall-forming material at a temperature lower than the gelling point of the gelatin employed as the hydrophilic colloid wall-forming material, but prior to the simultaneous presence in the system of said aldehyde and alkali material, in such an amount as sufficient to prevent an increase in viscosity due to the reaction of gelatin and aldehyde during said pre-hardening step.

2. The process of claim 1, wherein said gelatin having a lower isoelectric point than the other gelatin is a reaction product of gelatin and an aliphatic anhydride, an aromatic anhydride, a compound having a reactive halogen atom, an isocyanate or an N-arylvinylsulfonamide.

3. The process of claim 1, wherein the amount of said gelatin having the lower isoelectric point is at least 1/20 by weight based on the total weight of the hydrophilic colloids used to form the coacervates.

4. The process of claim 1, wherein the gelatin of lower isoelectric point is added at a temperature lower than about 20° C.

5. The process of claim 1, wherein the amount of said gelatin having the lower isoelectric point ranges from 1/10 to 1/2, by weight, based on the total weight of the hydrophilic colloids used to form the coacervates.

References Cited

UNITED STATES PATENTS

| | | |
|---|---|---|
| 3,328,257 | 6/1967 | Vrancken et al. _____ 252—316 X |
| 2,800,457 | 7/1957 | Green et al. _____ 252—316 |
| 3,317,434 | 5/1967 | Veis et al. _____ 252—316 |

FOREIGN PATENTS

| | | |
|---|---|---|
| 1,008,044 | 10/1965 | Great Britain _____ 252—316 |

RICHARD D. LOVERING, Primary Examiner

U.S. Cl. X.R.

117—36.8, 62.2, 100 A, 100 B; 264—4